United States Patent
Zhang

(10) Patent No.: US 10,291,453 B2
(45) Date of Patent: May 14, 2019

(54) MIXED GUARD INTERVALS IN OFDM SIGNAL DATA SEGMENTS

(71) Applicant: MARVELL WORLD TRADE LTD., St. Michael (BB)

(72) Inventor: Hongyuan Zhang, Fremont, CA (US)

(73) Assignee: MARVELL WORLD TRADE LTD. (BB)

( * ) Notice: Subject to any disclaimer, the term of this patent is extended or adjusted under 35 U.S.C. 154(b) by 0 days.

(21) Appl. No.: 15/086,311

(22) Filed: Mar. 31, 2016

(65) Prior Publication Data

US 2016/0212000 A1    Jul. 21, 2016

Related U.S. Application Data

(63) Continuation of application No. 14/523,328, filed on Oct. 24, 2014, now Pat. No. 9,306,786, which is a
(Continued)

(51) Int. Cl.
*H04L 27/00* (2006.01)
*H04L 27/26* (2006.01)
(Continued)

(52) U.S. Cl.
CPC .......... *H04L 27/2607* (2013.01); *H04B 1/04* (2013.01); *H04L 5/005* (2013.01); *H04L 5/0023* (2013.01);
(Continued)

(58) Field of Classification Search
None
See application file for complete search history.

(56) References Cited

U.S. PATENT DOCUMENTS 7,403,539 B1 *   7/2008   Tang .................... H04W 24/00
                                                            370/445
7,558,537 B2    7/2009   Trachewsky et al.
(Continued)

FOREIGN PATENT DOCUMENTS

CN    1318918 A    10/2001
CN    1832480 A    9/2006
(Continued)

OTHER PUBLICATIONS

Zhang, Zhao-Yang: "A Novel AFDM Transmission Scheme with Length-Adaptive Cycle Prefix," Journal of The Jiang University. Science, Zhejiang University Press, Hangzhou, CN vol. 5, No. 11, Jul. 7, 2003, pp. 1336-1342.
(Continued)

*Primary Examiner* — Adolf Dsouza

(57) ABSTRACT

Systems, methods, and other embodiments associated with generating wireless communication with a long guard interval followed by short guard intervals are described. According to one embodiment, a wireless communication device includes a transmitter configured to generate and transmit an orthogonal frequency-division multiplexing (OFDM) signal with (i) a preamble and (ii) a data segment following the preamble that includes a plurality of data symbols that are each respectively preceded by a guard interval. The transmitter is configured to generate (i) a first guard interval preceding a first data symbol in the data segment following the preamble as a long guard interval, and (ii) subsequent guard intervals that are subsequent to the first guard interval according to a type of guard intervals for the OFDM signal.

19 Claims, 7 Drawing Sheets

Related U.S. Application Data continuation of application No. 13/465,347, filed on May 7, 2012, now Pat. No. 8,873,680.

(60) Provisional application No. 61/487,581, filed on May 18, 2011, provisional application No. 61/563,409, filed on Nov. 23, 2011.

(51) Int. Cl.
*H04L 5/00* (2006.01)
*H04B 1/04* (2006.01)

(52) U.S. Cl.
CPC ...... *H04L 27/2605* (2013.01); *H04L 27/2613* (2013.01); *H04L 27/2626* (2013.01)

(56) References Cited

U.S. PATENT DOCUMENTS

| | | | |
|---|---|---|---|
| 7,773,565 | B2 | 8/2010 | Hansen et al. |
| 8,411,807 | B1* | 4/2013 | Rangarajan ............ H04L 69/22 375/316 |
| 8,532,077 | B2 | 9/2013 | Stacey et al. |
| 2002/0003773 | A1 | 1/2002 | Okada et al. |
| 2005/0180353 | A1 | 8/2005 | Hansen et al. |
| 2006/0176966 | A1 | 8/2006 | Stewart et al. |
| 2006/0182017 | A1 | 8/2006 | Hansen et al. |
| 2007/0183523 | A1 | 8/2007 | Koo et al. |
| 2009/0122771 | A1 | 5/2009 | Cai |
| 2009/0190465 | A1 | 7/2009 | Porat et al. |
| 2010/0202301 | A1 | 8/2010 | Wen et al. |
| 2010/0260159 | A1 | 10/2010 | Zhang et al. |
| 2012/0054587 | A1* | 3/2012 | Van Nee ............... H04L 1/0079 714/807 |
| 2012/0170563 | A1 | 7/2012 | Abraham et al. |
| 2012/0236971 | A1* | 9/2012 | Taghavi Nasrabadi et al. ............ H04L 5/0023 375/340 |

FOREIGN PATENT DOCUMENTS

| | | |
|---|---|---|
| JP | 2009509470 A | 9/2005 |
| JP | 2006304152 A | 11/2006 |
| WO | 2009052420 A2 | 4/2009 |
| WO | 2010120692 A1 | 10/2010 |

OTHER PUBLICATIONS

PCT Application No. PCT/US2012/036736, International Search Report & Written Opinion, mailed, 11 pages.
Chinese Application Serial No. 201280030073.4; SearchReport; dated Nov. 4, 2015, 2 pages.
Chinese Application Serial No. 201280030073.4; First Office Action; dated Nov. 4, 2015, 24 pages including English translation.
European Application Serial No. 12721137.3; Communication Pursuant to Rule 94(3) EPC; dated Dec. 7, 2017, 5 pages.
"IEEE Standard for Information Technology—Telecommunications and Information Exchange Between Systems—Local and Metropolitan Area Networks—Specific Requirements", IEEE Std 802.11n, Oct. 29, 2009.
"Japanese Patent Application No. 2014-511392, First Office Action, dated Jan. 26, 2016", 5 pages including English translation.
Korean Patent App. No. 20137033238, First Office Action, dated Jan. 14, 2019. 10 pages, including English translation.
Stacey, et al., "Specification Framework for TGac", IEEE 802.11 wireless LANs, IEEE 802.11-09/00992r21, Jan. 19, 2011.

* cited by examiner

MIXED GUARD INTERVALS IN OFDM SIGNAL DATA SEGMENTS

CROSS REFERENCE TO RELATED APPLICATIONS

This patent disclosure is a continuation of U.S. application Ser. No. 14/523,328 filed Oct. 24, 2014, now U.S. Pat. No. 9,306,786; which is a continuation of U.S. application Ser. No. 13/465,347 filed on May 7, 2012, now U.S. Pat. No. 8,873,680 which claims priority under 35 U.S.C. § 119(e) to U.S. Provisional Application Ser. No. 61/487,581 filed on May 18, 2011 and 61/563,409 filed on Nov. 23, 2011.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern computer systems often use wireless communications to transfer information between two or more devices that are not physically connected. While wireless communications improve the convenience of connecting to a network, wireless communications also introduce many difficulties. Among these difficulties is interference from the wireless channel on which the wireless communications are transferred.

For example, consider a wireless network in which a laptop computer is communicating with a wireless access point. One source of interference may occur when a signal sent from the laptop arrives at the access point via many different paths. These paths may occur as the result of reflections from walls and other obstacles between the devices. This is known as multipath propagation and can cause intersymbol interference. Accordingly, wireless computer systems may use techniques to mitigate intersymbol interference. However, these techniques may reduce throughput and cause processing delays.

SUMMARY

In one embodiment, a wireless communication device includes a transmitter configured to generate and transmit an orthogonal frequency-division multiplexing (OFDM) signal with (i) a preamble and (ii) a data segment following the preamble that includes a plurality of data symbols that are each respectively preceded by a guard interval. The transmitter is configured to generate (i) a first guard interval preceding a first data symbol in the data segment following the preamble as a long guard interval, and (ii) subsequent guard intervals that are subsequent to the first guard interval according to a type of guard intervals for the OFDM signal.

In one embodiment, a method includes generating an orthogonal frequency-division multiplexing (OFDM) signal by generating (i) a preamble followed by (ii) a data segment that includes a plurality of data symbols that are each respectively preceded by a guard interval. Generating the OFDM signal includes generating (i) a first guard interval preceding a first data symbol in the data segment as a long guard interval, and generating (ii) subsequent guard intervals to the first guard interval according to a type of guard intervals in the OFDM signal. The method includes transmitting the OFDM signal over a wireless communication medium using a transmitter.

In one embodiment, a device includes a transmitter configured to generate an orthogonal frequency-division multiplexing (OFDM) signal with a mixed pattern of guard intervals in a data segment that follows a preamble of the OFDM signal. The transmitter is configured to generate the OFDM signal with a field in the preamble to indicate (i) that the data segment includes guard intervals arranged in the mixed pattern. The transmitter is configured to wirelessly transmit the OFDM signal.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Figure 1:
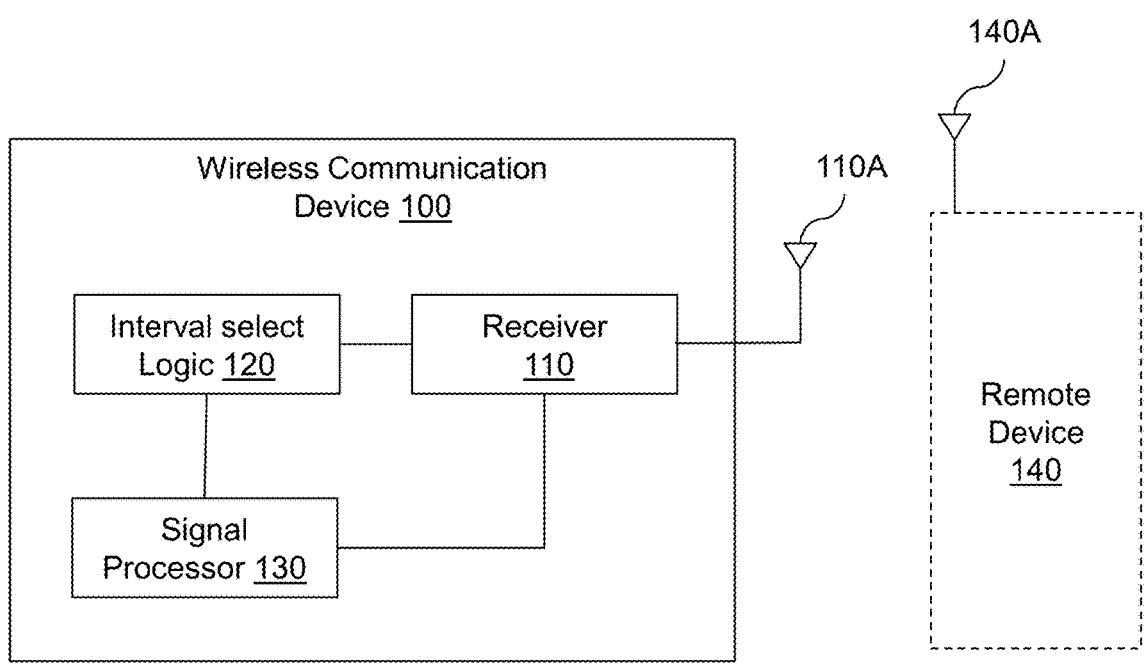
FIG. 1 illustrates one embodiment of an apparatus associated with processing single stream communications with a short guard interval and greenfield preamble.

Described herein are examples of methods, devices, and other embodiments associated with processing single stream communications that include greenfield preambles and short guard intervals. Wireless communication devices, for example those modulated by orthogonal frequency-division multiplexing (OFDM), use guard intervals when transmitting a communication to mitigate the effects of intersymbol interference. A guard interval occurs prior to a data symbol in the communication to provide time for interference (e.g., multipath interference) from a previous symbol to dissipate before a subsequent symbol is transmitted. In this way, a transmitting device can avoid creating interference in the subsequent data symbol by using the guard interval. The guard interval of a communication may be, for example, short (e.g., 0.4 µs) or long (e.g., 0.8 µs). A long guard interval can mitigate longer intersymbol interference than short guard intervals. However, long guard intervals consume a greater proportion of a symbol and thus cause a lower throughput than a short guard interval that occupies less time. Thus, for different circumstances a wireless communication device can choose to transmit communications with either a short or long guard interval. An example of such a system is a wireless local area network (LAN) system compatible with IEEE 802.11n, IEEE 802.11ac, IEEE 802.11af, IEEE 802.11ah standards, and so on.

To notify a receiving device of a type of guard interval and other configuration parameters about a communication, a transmitting device includes a preamble at the beginning of the communication. Accordingly, to properly interpret a communication, a receiving device decodes the preamble and determines the type of guard interval and other configuration parameters of the communication. However, the receiving device may not be able to determine the type of guard interval (referred to herein also as "guard interval type") before a first data symbol in the communication is received because decoding the preamble can be a time consuming process that is not completed before the first data symbol is received.

For example, consider a wireless device that receives a single stream communication that is using short guard intervals. The wireless device begins to decode the preamble to determine the guard interval type and other configuration parameters of the communication while still receiving additional portions of the communication after the preamble. However, by the time the wireless device determines the guard interval type, part of the first data symbol after the short guard interval may already have been received. Thus, the wireless device experiences difficulties processing the communication due to the lag time for decoding the preamble.

Therefore, in one embodiment, the transmitting device will transmit the communication with a long guard interval for a first data symbol in the communication and transmit subsequent data symbols in the communication with short guard intervals for single stream communications and/or multi-stream communications. In this way, a receiving wireless device can determine a type of guard interval used for the subsequent data symbols while always processing the first data symbol with a long guard interval. In another embodiment, instead of always processing the first guard interval as a long guard interval, the receiving device buffers the communication until the guard interval type has been determined. Once the guard interval type is known, the receiving device can process the buffered communication according to the determined guard interval type.

Embodiment 1: Long Guard Interval Followed by Short Guard Interval

With reference to FIG. 1, one embodiment of a wireless communication device 100 is shown that is associated with processing single stream communications with a short guard interval and greenfield preamble. The wireless communication device 100 may include a receiver 110 with an antenna 110A, interval select logic 120, and a signal processor 130. In one embodiment, the receiver 110 is configured to receive wireless communications from a remote device 140. The remote device 140 is, for example, a wireless network interface card (NIC) that includes an antenna 140A. The remote device 140 may be integrated in a wireless access point, a laptop computer, a smartphone, a tablet computer, and so on. Additionally, the wireless communication device 100 is, for example, a computer, a smartphone, a tablet computer, a laptop, a wireless access point, a network interface card (NIC), and so on.

The remote device 140 provides a communication to the wireless communication device 100 in the form of a radio frequency (RF) signal. In one embodiment, the RF signal is, for example, a sub 1 GHZ signal, a signal that is generated to be compatible with an implemented standard (e.g., IEEE 802.11ah, IEEE 802.11n, IEEE 802.11ac, and so on), a signal that is compatible with $3^{rd}$ generation mobile telecommunications (3G), a signal that is compatible with 3GPP Long Term Evolution (LTE), and so on.

In one embodiment, the radio frequency signal is encoded according to orthogonal frequency-division multiplexing (OFDM). Thus, the remote device 140 transmits an OFDM signal to the wireless communication device 100 to provide the communication. In one embodiment, the OFDM signal includes a preamble followed by a plurality of data symbols. The remote device 140 may use a greenfield preamble in the communication. A greenfield preamble is a type of preamble that does not account for compatibility with legacy devices. Greenfield preambles use less transmission overhead (e.g., fewer bits) because additional bits required for compatibility with legacy devices are not included. Accordingly, greenfield preambles may be used with high-throughput communications such as multi-stream communications (e.g., MIMO 802.11n communications). However, multi-stream communications add to the complexity of the preamble since more fields for providing configuration information about the multiple streams are included. Thus, the remote device 140 may be configured to also use greenfield preambles with single stream communications.

In one embodiment, the interval select logic 120 is configured to determine whether the OFDM signal is a single stream communication in order to, for example, know whether determining the guard interval type is time-sensitive. Thus, the interval select logic 120 may control the signal processor 130 to process a data segment of the OFDM signal according to a pattern of a long guard interval followed by a determined guard interval type (e.g., long or short) for remaining data symbols of the data segment. Additionally, the interval select logic 120 may also control the signal processor 130 to process multi-stream communications according to the same pattern of a long guard interval in a data segment followed by a determined guard interval type (e.g., long or short) for remaining data symbols of the data segment. Thus, in one embodiment, a transmitter device (e.g., transmitter in a remote device) is configured to generate and transmit signals of a multi-stream communication with a first guard interval of a data segment as a long guard interval and subsequent guard intervals as short guard intervals. In this way, a general mixed pattern (i.e., one long GI followed by short GIs) of guard intervals in the data segment of the OFDM signal is maintained for both single stream communications and multi-stream communications.

In another embodiment, when the communication is a single stream communication, the type of guard interval is always short. Thus the interval select logic 120 is configured to determine whether the communication is a multi-stream communication or a single stream communication to determine the guard interval type. Accordingly, if the OFDM signal is a single stream communication, the interval select logic 120 may control the signal processor 130 to automatically process a data segment of the OFDM signal according to a pattern of a long guard interval followed by short guard intervals for the remaining data symbols of the data segment.

Figure 2:
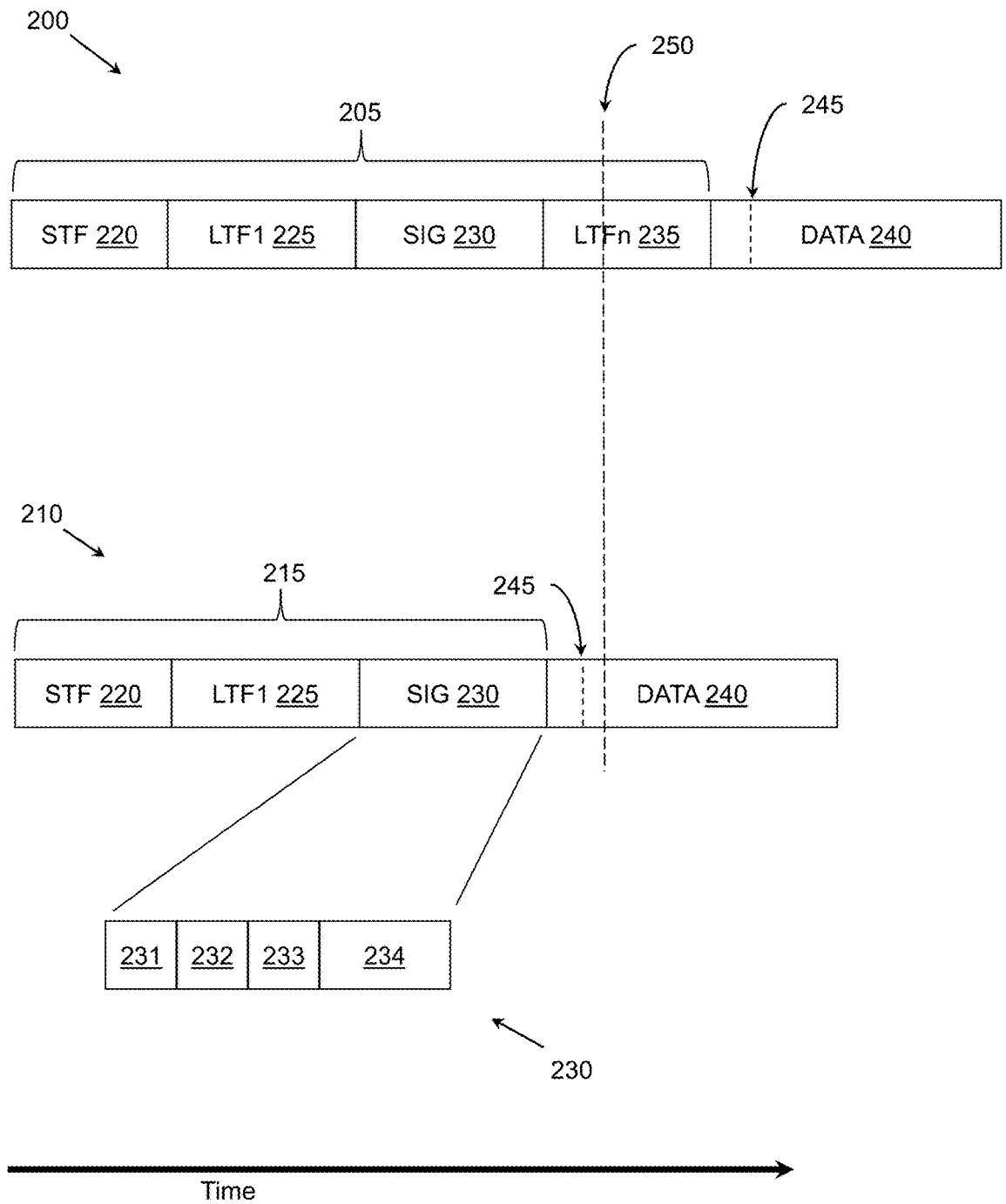
FIG. 2 illustrates example greenfield preamble formats for multi-stream and single stream signals.

One example of difficulties (e.g., processing delays) that may arise when using short guard intervals with single stream communications is illustrated with respect to FIG. 2. FIG. 2 illustrates a time axis in juxtaposition to an exemplary multi-stream communication 200 and an exemplary single stream communication 210. The multi-stream communication 200 includes a greenfield preamble 205 that is followed by a data segment 240. In one embodiment, the data segment 240 includes a plurality of data symbols that are each preceded by a guard interval. The greenfield preamble 205 includes a short training field (STF) 220, a first long training field (LTF1) 225, a signal (SIG) field 230, and one additional LTF field 235 for each additional stream beyond the first. The single stream communication 210 includes a greenfield preamble 215 with the same fields 220, 225, and 230 as in the multi-stream communication 200. To simplify the comparison, the single stream communication 210 is shown with the same data segment 240 as in the multi-stream communication 200. However, the greenfield preamble 215 does not include the additional LTFs 235 since there is only a single stream in the communication 210. It should be noted that while not discussed in detail, the preambles 205 and 215 also include one or more guard intervals. For example, the preambles 205 and 215 can include long guard intervals before each field, i.e., one before each field 220, 225, 230, and 235. However, the long guard intervals of the preamble are not the focus of this disclosure and will not be discussed in detail.

In one embodiment, the SIG field 230 of the preamble 215 includes a set of configuration parameters 231-234. The set of configuration parameters 231-234 includes an indicator that specifies the type of guard interval (e.g., field 232) used between symbols of the data segment 240. In the single stream communication 210, the SIG field 230 occurs directly before the data segment 240. Thus a receiving device has a limited time period to decode a guard interval type from the SIG field 230 prior to receiving the data segment 240. Accordingly, difficulties with decoding the SIG field 230 prior to a short guard interval lapsing in the data segment 240 may occur in single stream communications.

For purposes of comparison, consider that communications 200 and 210 are received in parallel in two separate devices. The dashed line 250 represents an example point in time during the reception of communications 200 and 210 when the decoding of the guard interval type from the SIG field 230 is complete. The dashed line 245 represents where a boundary between the end of a first short guard interval would occur and where the beginning of data in a first data symbol of the data segment 240 for the communication 210 occurs. Thus, in a device receiving the single stream communication 210 with short guard intervals, decoding of the guard interval type completes, for example, at 250 after the passing of the short guard interval at 245. By contrast, the multi-stream communication 200 is still receiving a portion of the greenfield preamble 205 at time point 250 when decoding of the guard interval type completes at time point 250. This time point is also before a time when the data segment 240 of the multi-stream communication 200 with a guard interval having a boundary at 245 even begins to be received.

Accordingly, the interval select logic 120 of FIG. 1 is configured to cause the signal processor 130 to process a first guard interval in the data segment 240 of the single stream communication 210 as a long guard interval and subsequent guard intervals based on an indicated type in the SIG field 230 (e.g., short or long). In this embodiment, the remote device 140 is also configured to generate the communication according to this configuration. In other words, the remote device 140 is configured to generate single stream communications with the first guard interval of the data segment as a long guard interval and subsequent guard intervals according to a selected guard interval type (e.g., either long or short guard intervals). In this way, the devices may mitigate difficulties with lag associated with decoding the guard interval type in single stream communications.

Additionally, the interval select logic 120 may be configured to determine the guard interval type of a communication based on whether the communication is a single stream communication since determining the guard interval type is time-sensitive in a single stream communication. The interval select logic 120 is configured to determine that the communication is a single stream communication based on, for example, (i) one or more parameters in the SIG field 230 that indicate the communication is a single stream communication, (ii) by determining if the SIG field 230 is the last field in the preamble prior to the data segment 240, or (iii) by determining that the SIG field includes a guard interval type indicator field.

Additionally, the remote device 140 may be configured to provide data segments for all communications in the format of a long guard interval followed by a selected type of guard interval (e.g., short or long). For example, the remote device 140 may generate all data segments 240, whether for single or multi-stream communications, in the format of a long guard interval followed by a selected type of guard interval for subsequent data symbols in the data segment 240; and the selected type of guard interval may be signaled in the SIG field 230 in the preamble. With continued reference to FIG. 2, consider that the boundary marker 245 of communications 200 and 210 now represents a terminal point for a long guard interval in the data segments 240. Thus, the data segments 240 include a long guard interval followed by guard intervals (not illustrated) of the type denoted by the SIG field 230 (e.g., short or long). Accordingly, once a guard interval type for a communication (e.g., a packet) from the remote device 140 is known, the interval select logic 120 is configured to use the same guard interval type for the remaining data symbols received from the remote device 140 within the same communication.

In one embodiment, the interval select logic 120 is configured to determine a guard interval type on a per communication basis. That is, the interval select logic 120 determines a guard interval type for each communication (e.g., each packet) received. In another embodiment, the interval select logic 120 causes the signal processor 130 to process a communication according to a guard interval type determined from a previous communication from the same device. Thus, if multiple communications (e.g., a plurality of packets) are received from the same device, then the interval select logic 120 uses a previously determined guard interval type for that device. In this way, the interval select logic 120 may determine a guard interval type for communications from a device only once.

Figure 3:
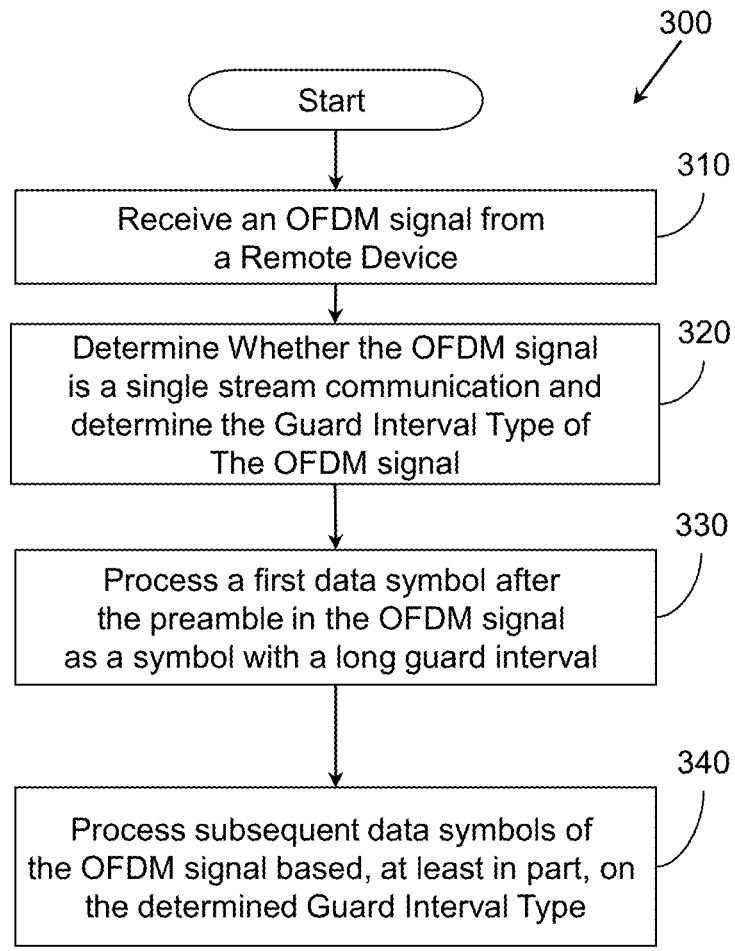
FIG. 3 illustrates one embodiment of a method associated with processing single stream communications with a short guard interval and greenfield preamble.

Further details of the wireless communication device 100 will be discussed in conjunction with FIG. 3. FIG. 3 illustrates one embodiment of a method 300 associated with processing a single stream communication that includes short guard intervals and a greenfield preamble. FIG. 3 is discussed from the perspective that the method 300 is implemented and performed by the wireless communication device 100 of FIG. 1 to determine the type of guard interval used in communications sent from the remote device 140. In the following discussion, only a single remote device 140 is discussed, however, multiple remote devices may simultaneously communicate with the wireless communication device 100.

At 310, the method 300 begins when the wireless communication device 100 receives an OFDM signal from the remote device 140. The wireless communication device 100 progressively receives the OFDM signal from the remote device 140 over a span of time. Thus the entire communication (e.g., packet) embodied by the OFDM signal is not immediately available for processing. However, a first segment of the communication includes a preamble with configuration information that is processed while additional segments of the communication are received.

Thus, at 320, the wireless communication device 100 determines the guard interval type of the OFDM signal, for example, from the portion of the OFDM signal that has been received (e.g., the SIG field in the preamble). Determining the type of guard interval may occur in several different ways. For example, if the signal is a single stream communication then the guard interval may be configured to always be a short guard interval. Thus, in this example, the method 300 determines the guard interval type by determining whether the communication is a single stream communication. To determine that the signal is a single stream communication, the wireless communication device 100 may, for example, determine if a SIG field is i) the last field of the preamble and ii) directly before a data segment, check an indicator field in the SIG field, and so on.

In another embodiment, at 320, the method 300 may determine the guard interval type by decoding a guard type indicator in the preamble of the OFDM signal (e.g., decoding the SIG field in the preamble of a single or multi-stream communication). The guard type indicator specifies if the signal is using a short or long guard interval in the data segment of the current communication. In yet another embodiment, at 320, the method 300 may determine the guard interval type by first checking if the signal is a single stream communication and then checking an indicator in the preamble for a guard interval type.

At 330, the OFDM signal is processed. It should be noted that block 330 may occur in parallel or substantially in parallel with block 320. For example, as the guard type interval is being determined at 320, the wireless communication device 100 is receiving and begins to process a first portion of a data segment (e.g., a first OFDM data symbol) of the signal that occurs after the preamble. When the wireless communication device 100 begins to process the first data segment, configuration parameters from the preamble that describe how the signal is encoded have not yet been decoded due to, for example, processing delays. Thus, the wireless communication device 100 processes the first data symbol in the data segment of the OFDM signal according to a predetermined configuration. In one embodiment, the predetermined configuration includes always processing a first guard interval for the first data symbol of the OFDM signal as a long guard interval. In this way, processing is not delayed for a first data symbol that is received before configuration information is decoded.

At 340, the wireless communication device 100 can process subsequent data symbols based, at least in part, on the determination from block 320 of the method 300. It should be noted that when processing the first data symbol of the data segment according to a predetermined configuration, the remote device 140 is configured to provide the OFDM signal according to the predetermined configuration.

Figure 4:
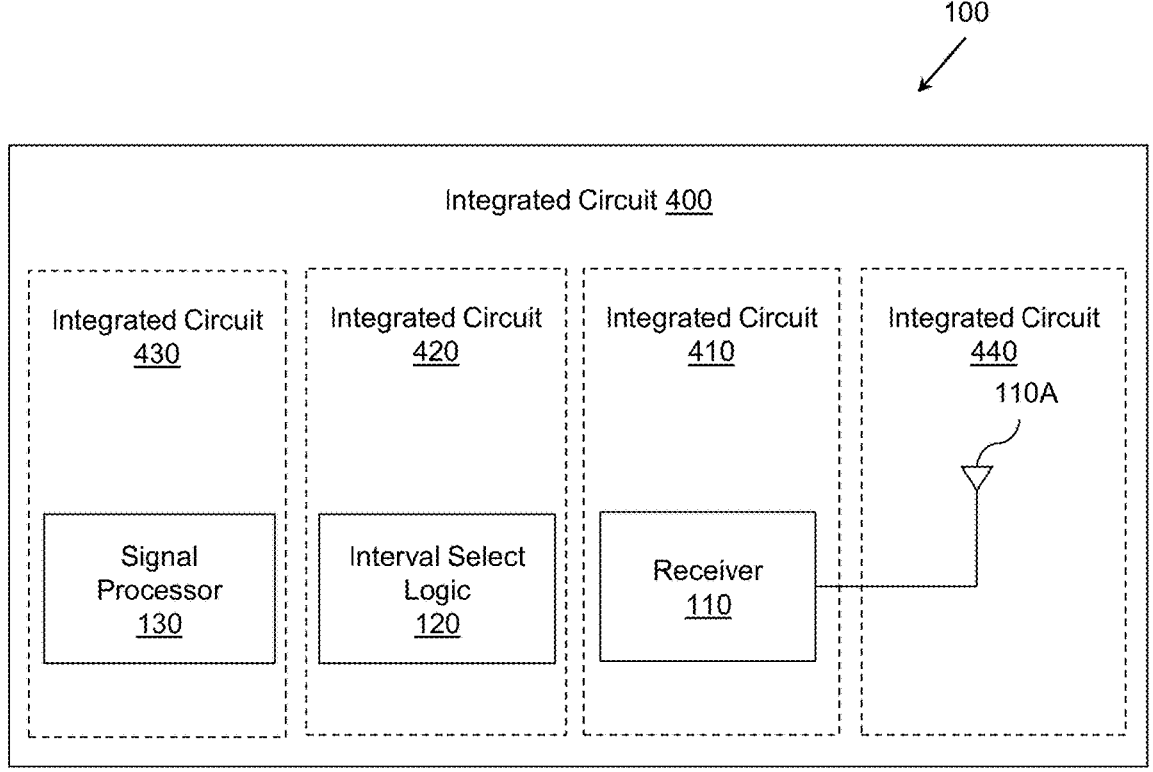
FIG. 4 illustrates one embodiment of an integrated circuit associated with processing single stream communications with a short guard interval and greenfield preamble.

FIG. 4 illustrates an additional embodiment of the wireless communication device 100 from FIG. 1 that is configured with separate integrated circuits and/or chips. In this embodiment, the receiver 110 from FIG. 1 is embodied as a separate integrated circuit 410. The antenna 110A is also embodied on an individual integrated circuit 440. Additionally, the interval select logic 120 is embodied on an individual integrated circuit 420. The signal processor 130 is embodied on an individual integrated circuit 430. The circuits are connected via connection paths to communicate signals. While integrated circuits 410, 420, 430, and 440 are illustrated as separate integrated circuits, they may be integrated into a common circuit board 400. Additionally, integrated circuits 410, 420, 430, and 440 may be combined into fewer integrated circuits or divided into more integrated circuits than illustrated. Additionally, in another embodiment, the signal processor 130, the interval select logic 120, and the receiver 110 (which are illustrated in integrated circuits 430, 420, and 410, respectively) may be combined into a separate application-specific integrated circuit. In other embodiments, portions of the functionality associated with the interval select logic 120 and the signal processor 130 may be embodied as firmware executable by a processor and stored in a non-transitory memory.

Embodiment 2: Buffering the OFDM Signal while Determining a Guard Interval Type

Figure 5:
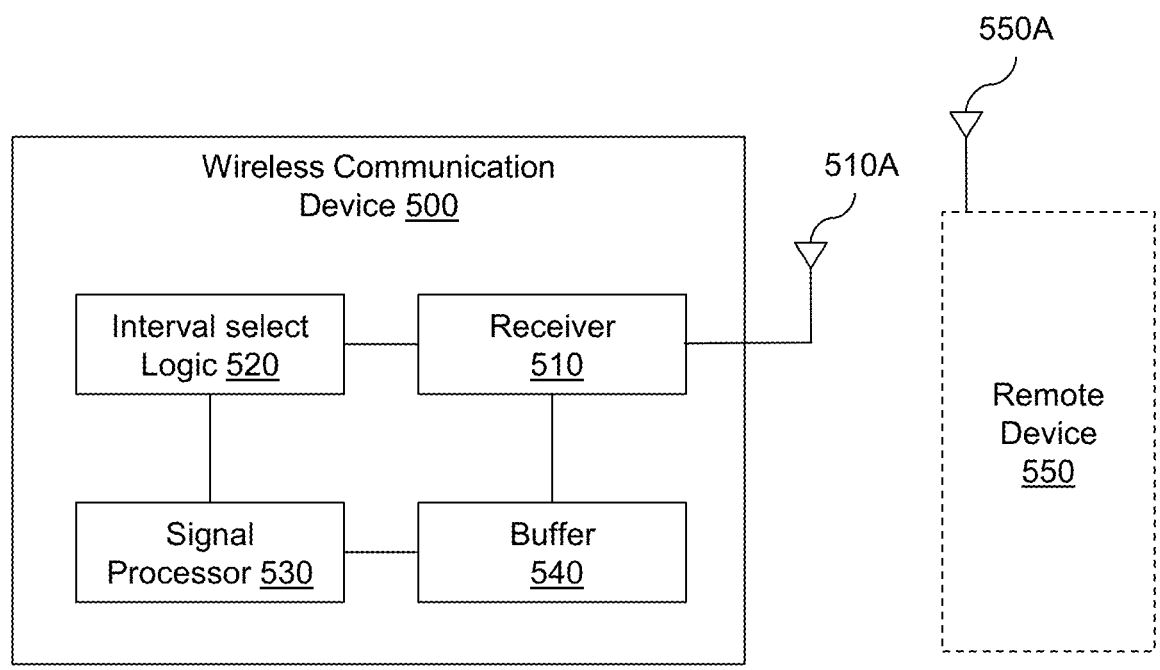
FIG. 5 illustrates one embodiment of an apparatus associated with processing single stream communications with a short guard interval and greenfield preamble.

FIG. 5 illustrates a wireless communication device 500 that includes elements similar to the wireless communication device 100 of FIG. 1. For example, similar to the wireless communication device 100, the wireless communication device 500 includes a receiver 510 with an antenna 510A, an interval select logic 520, and a signal processor 530. However, wireless communication device 500 also includes a buffer 540. The receiver 510 is configured to receive, for example, communications in the form of OFDM signals from a remote device such as remote device 550. The remote device 550 is a device that is similar to the remote device 140 of FIG. 1.

In one embodiment, the interval select logic 520 is configured to determine the type of guard interval for a communication. The interval select logic 520 may determine the type of guard interval in several different ways. In one embodiment, the interval select logic 520 is configured to determine the guard interval type by decoding a guard type indicator in the preamble of the OFDM signal. The guard type indicator specifies if the signal is using a short or long guard interval by, for example, the presence of a "1" or "0" bit in the guard type indicator field. In another embodiment, the interval select logic 520 is configured to determine the guard interval type by first checking if the signal is a single stream communication and then checking an indicator in the preamble for a guard interval type.

While the interval select logic 520 is determining the guard interval type, the buffer 540 is configured to buffer the incoming OFDM signal. For example, as discussed above with reference to FIG. 2, decoding of the guard interval type for the data segment in a single stream communication does not complete in time to process the first data symbol in the communication with the indicated guard interval type. Thus, in one embodiment, the receiver 510 is configured to buffer the incoming communication in the buffer 540 to provide the interval select logic 520 with sufficient time to decode the type of guard interval for the signal. In this way, the wireless communication device 500 can mitigate the decoding delay for the guard interval type without the remote device 550 generating the communication in a particular way to account for the delay.

Additionally, the interval select logic 520 is configured to provide the guard interval type to the signal processor 530 upon completing the determination of the type. Thus, when the communication is configured with a short guard interval, in one embodiment, the signal processor 530 is configured to adjust the bit length for the buffered data symbol to account for the guard interval type.

Figure 6:
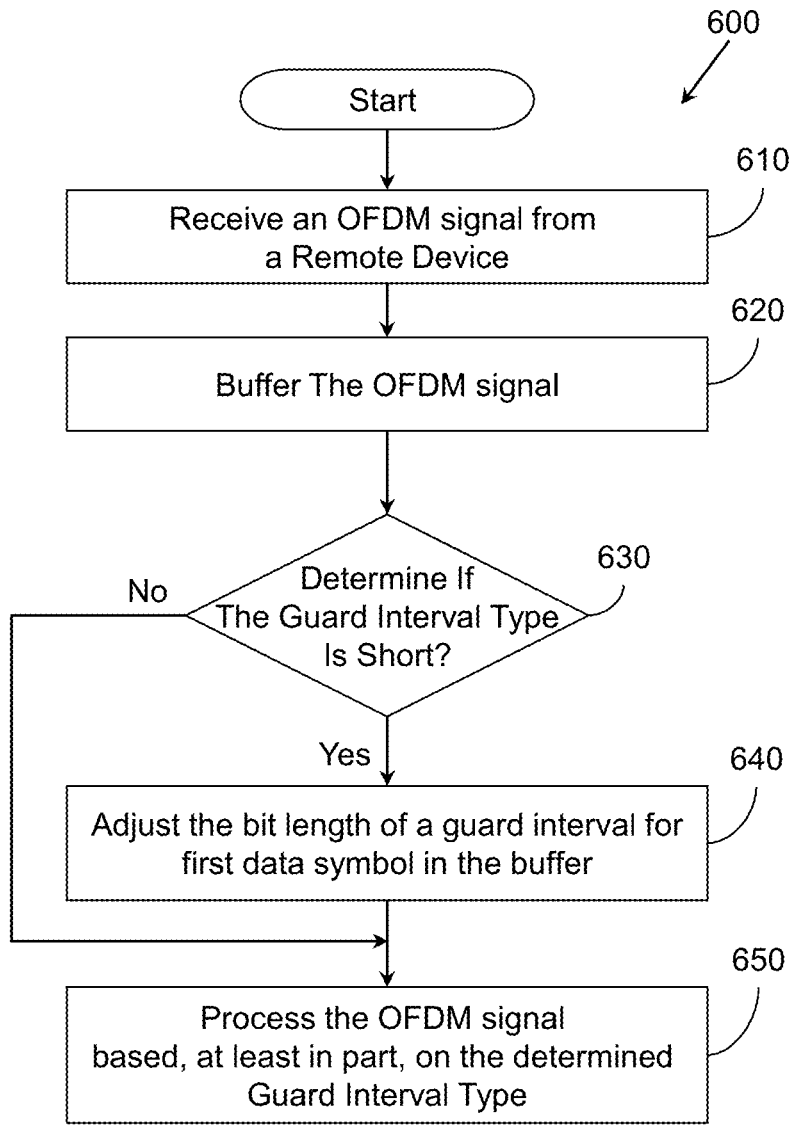
FIG. 6 illustrates one embodiment of a method associated with processing single stream communications with a short guard interval and greenfield preamble.

Further details of the wireless communication device 500 will be discussed in conjunction with FIG. 6. FIG. 6 illustrates one embodiment of a method 600 associated with processing single stream communications with a short guard interval and greenfield preamble. FIG. 6 is discussed from the perspective that the method 600 is implemented and performed by the wireless communication device 500 of FIG. 5 to determine the type of guard interval used in communications sent from the remote device 550. In the following discussion, only a single remote device 550 is discussed, however, multiple remote devices may simultaneously communicate with the wireless communication device 500.

At 610 of method 600, the wireless communication device 500 begins to receive a communication in, for example, the form of an OFDM signal from the remote device 550. At 620, the wireless communication device 500 buffers the OFDM signal as it is received. In one embodiment, blocks 610, 620 and 630 occur substantially in parallel. For example, at 630, as the wireless communication device 500 determines if the guard interval type is a short guard interval, the OFDM signal is also being buffered as it is received. Accordingly, by buffering the communication the wireless communication device can defer processing the communication until configuration parameters from the preamble are identified. The configuration parameters include the guard interval type and, for example, information that indicates whether the communication is a single stream communication, a type of encoding used with the communication, and so on.

If the communication is encoded using a short guard interval, then method 600 proceeds to 640. At 640, the wireless communication device 500 adjusts, for example, a bit length for the guard interval of the buffered data symbol to be compatible with the short guard interval. In one embodiment, when the communication is configured with short guard intervals, processing of the signal may be modified from a default interval (e.g., a long guard interval) to a shorter span so that a first portion of the data symbol is not lost or incorrectly processed as being part of the long guard interval.

Accordingly, at 650, the wireless communication device 500 can process a first data symbol in the OFDM signal after the encoded guard interval type is known. In this way, processing difficulties with lag time in decoding a preamble of the OFDM signal can be avoided.

Figure 7:
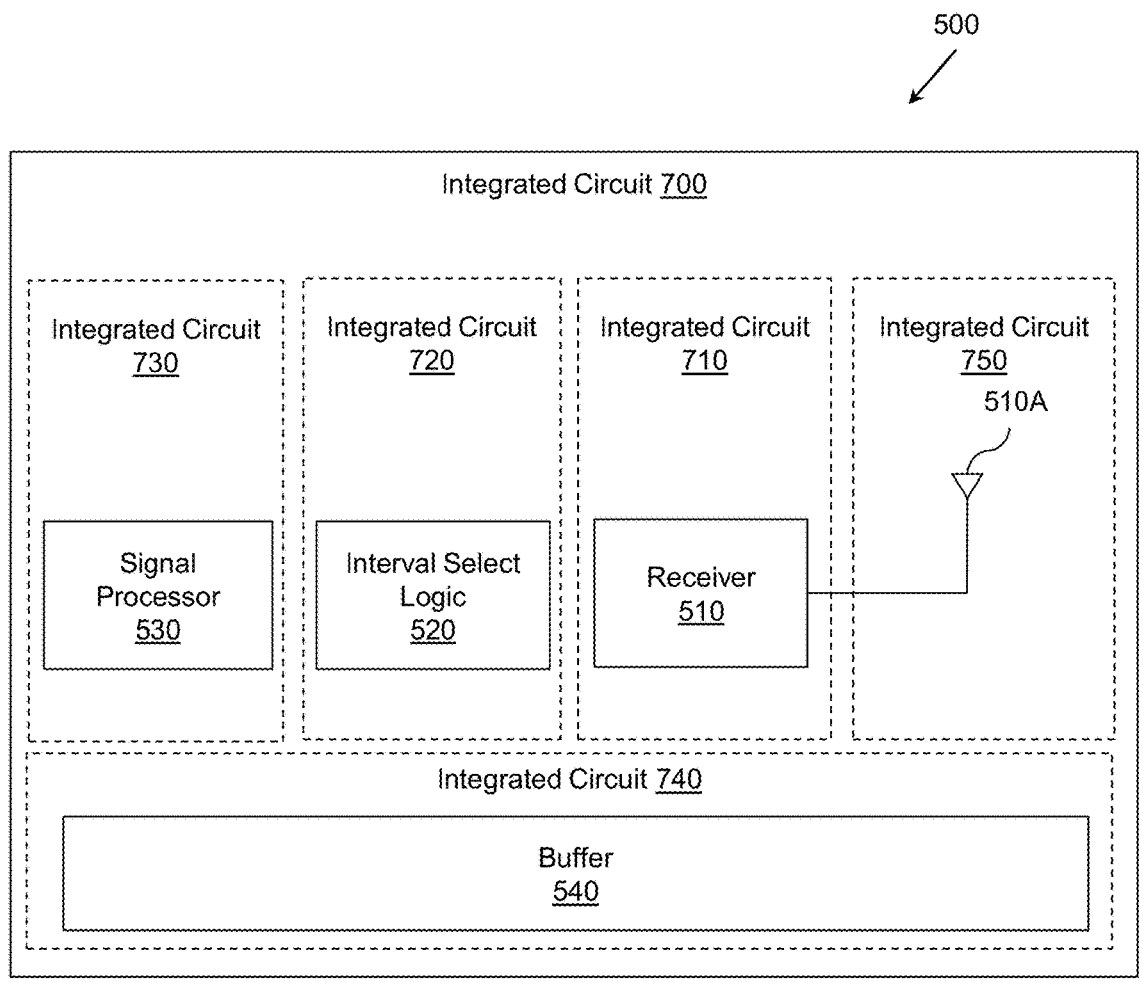
FIG. 7 illustrates one embodiment of an integrated circuit associated with processing single stream communications with a short guard interval and greenfield preamble.

FIG. 7 illustrates an additional embodiment of the wireless communication device 500 from FIG. 5 that is configured with separate integrated circuits and/or chips. In this embodiment, the interval select logic 520 from FIG. 5 is embodied as a separate integrated circuit 720. Additionally, the receiver 510 is embodied on an individual integrated circuit 710. The antenna 510A is also embodied on an individual integrated circuit 750. The signal processor 530 and the buffer 540 are also embodied on individual integrated circuits 730 and 740 respectively. The circuits are connected via connection paths to communicate signals. While integrated circuits 710, 720, 730, 740, and 750 are illustrated as separate integrated circuits, they may be integrated into a common integrated circuit board 700. Additionally, integrated circuits 710, 720, 730, 740, and 750 may be combined into fewer integrated circuits or divided into more integrated circuits than illustrated. Additionally, in another embodiment, the interval select logic 520, the signal processor 530, and the buffer 540 (which are illustrated in integrated circuits 720, 730, and 740, respectively) may be combined into a separate application-specific integrated circuit. In other embodiments, portions of the functionality associated with the interval select logic 520, the signal processor 530, and the buffer 540 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor programmed with an algorithm based on the disclosed methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

For purposes of simplicity of explanation, illustrated methodologies are shown and described as a series of blocks. The methodologies are not limited by the order of the blocks, as some blocks can occur in different orders and/or concurrently with other blocks from those shown and described. Moreover, less than all the illustrated blocks may be used to implement an example methodology. Blocks may be combined or separated into multiple components. Furthermore, additional and/or alternative methodologies can employ additional blocks that are not illustrated, To the extent that the term "includes" or "including" is employed in the detailed description of the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A wireless communication device, comprising:
a transmitter configured to generate and transmit an orthogonal frequency-division multiplexing (OFDM) signal with (i) a preamble and (ii) a data segment following the preamble that includes a plurality of data symbols that are each respectively preceded by a guard interval,
wherein the transmitter is configured to:
  (i) generate a first guard interval as a long guard interval irrespective of a type of guard intervals for the OFDM signal as indicated in a preamble field, of the preamble, that indicates the type of guard intervals, wherein the first guard interval is placed in the OFDM signal preceding a first data symbol of the plurality of data symbols in the data segment following the preamble, and
  (ii) generate a plurality of second guard intervals that are subsequent to the first guard interval according to the type of guard intervals for the OFDM signal as indicated in the preamble field that indicates the type of guard intervals, wherein the plurality of second guard intervals are generated as having a same guard interval type;
wherein the transmitter is configured to position the preamble field as a last field of the preamble to indicate (i) that the first guard interval is the long guard interval and the second guard intervals are indicated in the preamble field and (ii) that the OFDM signal is a single stream communication.

2. The wireless communication device of claim 1, wherein the transmitter is configured to generate the preamble with the preamble field that indicates the type of guard intervals for the OFDM signal.

3. The wireless communication device of claim 1, wherein the transmitter is configured to generate the first guard interval and the plurality of second guard intervals in the OFDM signal with one of a mixed pattern or a uniform pattern depending on a type of OFDM signal.

4. The wireless communication device of claim 1, wherein the OFDM signal is one signal of a multi-stream communication that includes two or more signals.

5. The wireless communication device of claim 1, wherein the transmitter is configured to generate the plurality of second guard intervals that are subsequent to the first guard interval as short guard intervals when the OFDM signal is one signal of a multi-stream communication.

6. The wireless communication device of claim 1, wherein the OFDM signal is a first OFDM signal transmitted to a remote device, and
wherein the transmitter is configured to generate OFDM signals that are subsequent to the first OFDM signal based, at least in part, on the type of guard intervals for the first OFDM signal.

7. The wireless communication device of claim 1, wherein the wireless communication device is embedded within a wireless network interface card (NIC).

8. A method, comprising:
generating an orthogonal frequency-division multiplexing (OFDM) signal by generating (i) a preamble followed by (ii) a data segment that includes a plurality of data symbols that are each respectively preceded by a guard interval,
wherein generating the OFDM signal includes:
  (i) generating a first guard interval as a long guard interval irrespective of a type of guard intervals for the OFDM signal as indicated in a preamble field, of the preamble, that indicates the type of guard intervals, wherein the first guard interval is placed in the OFDM signal preceding a first data symbol in the data segment, and
  (ii) generating a plurality of second guard intervals that are subsequent to the first guard interval according to the type of guard intervals in the OFDM signal as indicated in the preamble field that indicates the type of guard intervals, wherein the plurality of second guard intervals are generated as having a same guard interval type;
  wherein the preamble field is positioned as a last field of the preamble to indicate (i) that the first guard interval is the long guard interval and the second guard intervals are indicated in the preamble field and (ii) that the OFDM signal is a single stream communication; and
transmitting the OFDM signal over a wireless communication medium using a transmitter.

9. The method of claim 8, wherein generating the OFDM signal includes generating the preamble with the preamble field that indicates the type of guard intervals for the OFDM signal.

10. The method of claim 8, wherein generating the OFDM signal includes generating the first guard interval and the plurality of second guard intervals in the OFDM signal according to one of a mixed pattern or a uniform pattern depending on a type of OFDM signal.

11. The method of claim 8, wherein generating the OFDM signal includes generating the OFDM signal as one signal of a multi-stream communication that includes two or more signals.

12. The method of claim 8, wherein generating the OFDM signal includes generating the preamble as a greenfield preamble with a signal (SIG) field that specifies the type of guard intervals used between the data symbols of the data segment.

13. The method of claim 8, wherein the OFDM signal is a first OFDM signal transmitted to a remote device, and
wherein generating OFDM signals that are subsequent to the first OFDM signal is based, at least in part, on the type of guard intervals for the first OFDM signal.

14. The method of claim 8, wherein generating the OFDM signal includes generating the plurality of second guard intervals that are subsequent to the first guard interval as short guard intervals when the OFDM signal is one signal of a multi-stream communication.

15. A device, comprising:
a transmitter configured to generate an orthogonal frequency-division multiplexing (OFDM) signal with a mixed pattern of guard intervals in a data segment that follows a preamble of the OFDM signal,
wherein the transmitter is configured to generate the OFDM signal with a field in the preamble to indicate that the data segment includes guard intervals arranged in the mixed pattern,
wherein the transmitter is configured to generate the mixed pattern of guard intervals by:
  (i) generating a first guard interval in the data segment as a long guard interval irrespective of a type of guard intervals for the OFDM signal as indicated in the field of the preamble, and
  (ii) generating a plurality of second guard intervals, that are subsequent to the first guard interval, in the data segment as short guard intervals when the OFDM signal is part of a multi-stream communication including at least two signals, and wherein the transmitter is configured to wirelessly transmit the OFDM signal;
  wherein the field of the preamble is positioned as a last field of the preamble to indicate (i) that the first guard interval is the long guard interval and the second guard intervals are indicated in the field of the preamble and (ii) that the OFDM signal is a single stream communication.

16. The device of claim 15, wherein the transmitter is configured to generate the OFDM signal with the mixed pattern depending on a type of OFDM signal.

17. The device of claim 15, wherein the transmitter generates the plurality of second guard intervals in the OFDM signal according to the type of guard intervals for the OFDM signal as indicated in the field, and
  wherein the transmitter is configured to generate the OFDM signal with the mixed pattern of guard intervals when the OFDM signal is the single stream communication.

18. The device of claim 15, wherein the OFDM signal is a first OFDM signal transmitted to a remote device, and
  wherein the transmitter is configured to generate a plurality of OFDM signals that are subsequent to the first OFDM signal based, at least in part, on a pattern of guard intervals for the first OFDM signal.

19. The device of claim 15, wherein the device is a wireless network interface card (NIC).

* * * * *